United States Patent
Igarashi

(10) Patent No.: US 9,511,331 B2
(45) Date of Patent: Dec. 6, 2016

(54) PROCESS FOR PRODUCING HYDROGEN-CONTAINING WATER FOR DRINKING

(75) Inventor: Junichi Igarashi, Kanuma (JP)

(73) Assignee: SHEFCO CO., LTD., Tokyo (JP)

( * ) Notice: Subject to any disclaimer, the term of this patent is extended or adjusted under 35 U.S.C. 154(b) by 160 days.

(21) Appl. No.: 13/321,682

(22) PCT Filed: Apr. 2, 2010

(86) PCT No.: PCT/JP2010/056100
§ 371 (c)(1),
(2), (4) Date: Nov. 21, 2011

(87) PCT Pub. No.: WO2010/134387
PCT Pub. Date: Nov. 24, 2010

(65) Prior Publication Data
US 2012/0070540 A1    Mar. 22, 2012

(30) Foreign Application Priority Data

May 21, 2009  (JP) ................. 2009-123310

(51) Int. Cl.
*B01F 3/04*   (2006.01)
*A23L 2/54*   (2006.01)
*B01D 19/00*  (2006.01)
*B01F 5/04*   (2006.01)
*C02F 9/00*   (2006.01)
(Continued)

(52) U.S. Cl.
CPC ............ *B01F 3/0446* (2013.01); *A23L 2/54* (2013.01); *B01D 19/0031* (2013.01);
(Continued)

(58) Field of Classification Search
CPC ............................ B01F 3/0446; A23L 2/54
See application file for complete search history.

(56) References Cited

U.S. PATENT DOCUMENTS 3,551,091 A * 12/1970 Veloz ................. 210/251
5,536,400 A *  7/1996 Schultz ............... 210/192
(Continued)

FOREIGN PATENT DOCUMENTS

JP    A-2000-008083    1/2000
JP    A-2000-189742    7/2000
(Continued)

OTHER PUBLICATIONS

Battino, Rubin et al. "The Solubility of Gases in Liquids". Chem. Rev., 1966, 66, pp. 395-463.*
(Continued)

*Primary Examiner* — Jenna A Watts
(74) *Attorney, Agent, or Firm* — Oliff PLC

(57) ABSTRACT

A process for continuously producing hydrogen-containing water for drinking includes (a) filtering and purifying water as a raw material; (b) degassing the purified water supplied to a degasser; (c) dissolving hydrogen gas in the degassed water supplied to a hydrogen dissolution device; (d) sterilizing the hydrogen-dissolved water supplied to a sterilizer; (e) filling the hydrogen-containing water supplied to a filling device in a sealed container and transferring the filled water product to a heat sterilizer; and (f) heat-sterilizing the water product supplied to the heat sterilizer, wherein part of the hydrogen-containing water obtained in step (d) is returned to the degasser in step (b) and the water is circulated through steps (b) to (d).

2 Claims, 2 Drawing Sheets

(51) Int. Cl.
*C02F 1/02* (2006.01)
*C02F 1/20* (2006.01)
*C02F 1/28* (2006.01)
*C02F 1/32* (2006.01)
*C02F 1/44* (2006.01)
*C02F 1/467* (2006.01)
*C02F 1/70* (2006.01)

(52) U.S. Cl.
CPC ...... *B01D 19/0036* (2013.01); *B01F 3/04808* (2013.01); *B01F 3/04815* (2013.01); *B01F 5/0476* (2013.01); *C02F 9/00* (2013.01); *A23V 2002/00* (2013.01); *B01F 2003/04914* (2013.01); *C02F 1/02* (2013.01); *C02F 1/20* (2013.01); *C02F 1/283* (2013.01); *C02F 1/32* (2013.01); *C02F 1/444* (2013.01); *C02F 1/4676* (2013.01); *C02F 1/70* (2013.01)

(56) References Cited

U.S. PATENT DOCUMENTS

| | | | |
|---|---|---|---|
| 2003/0094610 A1* | 5/2003 | Aoki et al. | 257/48 |
| 2003/0132104 A1 | 7/2003 | Yamashita et al. | |
| 2005/0224996 A1 | 10/2005 | Yoshida | |

FOREIGN PATENT DOCUMENTS

| | | |
|---|---|---|
| JP | A-2001-113268 | 4/2001 |
| JP | A-2003-205299 | 7/2003 |
| JP | B1-3606466 | 1/2005 |
| JP | A-2005-074325 | 3/2005 |
| JP | A-2005-218885 | 8/2005 |
| JP | A-2005-296794 | 10/2005 |
| JP | A-2006-116504 | 5/2006 |
| JP | A-2008-006332 | 1/2008 |
| JP | A-2009-125654 | 6/2009 |

OTHER PUBLICATIONS

U. of Victoria, CA "Degassing". Available online as of Aug. 1, 2005 from web/uvic.ca. pp. 1-3.*
Lenntech Microfiltration and Ultrafiltration NPL. Retrieved online Nov. 25, 2013 from www.lenntech.com. p. 1.*
Ansari et al. "An Overview of Sterilization Methods for Packaging Materials used in Aseptic Packaging Systems". Institution of Chemical Engineers, vol. 81, Part C, Mar. 2003. pp. 57-65.*
International Search Report issued in International Application No. PCT/JP2010/056100 dated Jul. 6, 2010.

* cited by examiner

PROCESS FOR PRODUCING HYDROGEN-CONTAINING WATER FOR DRINKING

TECHNICAL FIELD

The present invention relates to a process for producing hydrogen-containing water for drinking.

BACKGROUND ART

In recent years, hydrogen-dissolved water (also simply called hydrogen water) that dissolves hydrogen gas in (ultra) pure water has been used for washing semiconductor silicon substrates, liquid crystal glass substrates, and the like, and is considered to have a suppressive effect on metal oxidation and spoilage of foods due to its high reductivity. Furthermore, an application of hydrogen-dissolved water to drinking water has been drawing attention because such water may improve various health disorders.

Examples of a process for producing the hydrogen-dissolved water include a process of dissolving, in raw water, hydrogen gas from a gas cylinder or hydrogen gas generated by water electrolysis.

However, when hydrogen gas is simply supplied into raw water at room temperature under atmospheric pressure, the dissolved hydrogen concentration is far below from the saturated hydrogen concentration because nitrogen gas, oxygen gas, and the like dissolved in the raw water interfere with the dissolution of the hydrogen gas.

On this account, for example, there is proposed a process in which a pressure container from which air is removed is filled with hydrogen gas, and raw water is showered in the pressure container to come in contact with the hydrogen gas while keeping the pressure of hydrogen gas at 2 to 10 atmospheres in the pressure container so as to efficiently dissolve the hydrogen gas (Patent Document 1).

RELATED ART DOCUMENT

Patent Document

Patent Document 1: Japanese Patent No 3606466

DISCLOSURE OF THE INVENTION

Problem to be Solved by the Invention

The producing process disclosed in Patent Document 1 has problems. That is, the producing process disclosed in Patent Document 1 employs a batch-wise process and thus has low productivity. Therefore, the size of a production apparatus needs to be increased in order to mass-produce the hydrogen water. Furthermore, hydrogen gas cannot be efficiently dissolved in raw water, and the hydrogen concentration varies depending on each lot.

Means for Solving the Problem

The inventors of the present invention have carried out an intensive study in order to solve the problems above, and as a result, the inventors have found that, by repeatedly carrying out a step of first degassing remaining gas from water as a raw material, and a subsequent step of introducing the obtained degassed water and pressurized hydrogen gas into a gas permeable membrane module to dissolve the hydrogen gas into the degassed water in a closed system, the dissolved hydrogen concentration of the obtained hydrogen water can be more efficiently increased. The present invention has been thereby accomplished.

That is, the present invention related to a process for continuously producing hydrogen-containing water for drinking characterized by including (a) a purifying step of filtering and purifying water as a raw material in a purification device and transferring the purified water obtained to a degasser, (b) a degassing step of degassing the purified water supplied to the degasser and transferring the degassed water obtained to a hydrogen dissolution device, (c) a hydrogen-dissolving step of dissolving hydrogen gas in the degassed water supplied to the hydrogen dissolution device and transferring the hydrogen-dissolved water obtained to a sterilizer, (d) a sterilizing step of sterilizing the hydrogen-dissolved water supplied to the sterilizer and transferring the hydrogen-containing water obtained to a filling device, (e) a filling step of filling the hydrogen-containing water supplied to the filling device in a sealed container and transferring the filled water product to a heat sterilizer, and (f) a heat-sterilizing step of heat-sterilizing the water product supplied to the heat sterilizer. The hydrogen dissolution device is partitioned into a water room and a gas room by a gas permeable membrane and includes a gas permeable membrane module that dissolves hydrogen gas in the degassed water by allowing the degassed water to pass through the water room and by pressurizing the hydrogen gas and supplying the pressurized hydrogen gas into the gas room. Part of the hydrogen-containing water obtained in the step (d) is returned to the degasser in the step (b) and the water is circulated through the steps (b) to (d).

In the producing process according to the present invention, it is preferable that the purification device include an activated carbon filtration device and an MF membrane filtration device.

It is preferable that the degasser be partitioned into a water room and a gas room by a degassing membrane and include a degassing membrane module that allows the purified water to pass through the water room and depressurizes the gas room.

It is preferable that the sterilizer include an ultraviolet irradiation device and an MF membrane filtration device.

In the producing process according to the present invention, it is preferable that supply of the purified water to the degasser be temporarily stopped and the water is circulated through (b) the degassing step, (c) the hydrogen-dissolving step, to (d) the sterilizing step.

Effect of the Invention

In the process for producing hydrogen-containing water for drinking according to the present invention, by sequentially carrying out each treatment of purifying, degassing, hydrogen-dissolving, and sterilizing in a closed system, especially by dissolving hydrogen gas using the gas permeable membrane module that supplies pressurized hydrogen gas, and particularly by repeating the treatments of degassing, hydrogen-dissolving, and sterilizing through water circulation, hydrogen-containing water efficiently dissolving hydrogen gas at high concentration can be produced.

Especially in the producing process according to the present invention, by the repeated circulation of water through (b) the degassing step, (c) the hydrogen-dissolving step, to (d) the sterilizing step after stopping the supply of the purified water to the degasser, the hydrogen gas can be more efficiently dissolved at high concentration.

In the process for producing hydrogen-containing water for drinking according to the present invention, the microfiltration membrane (MF membrane) is employed as the membrane filtration device used in the purifying step and the sterilizing step. The membrane can completely remove common bacteria such as coliform organisms, pathogenic protozoa *Cryptosporidium*, and the like that can proliferate in raw water as well as can leave all mineral components dissolved in raw water, such as sodium ions and potassium ions that improve the taste of hydrogen water for drinking. Therefore, safe and tasty hydrogen-containing water can be produced.

BEST MODES FOR CARRYING OUT THE INVENTION

Figure 1:
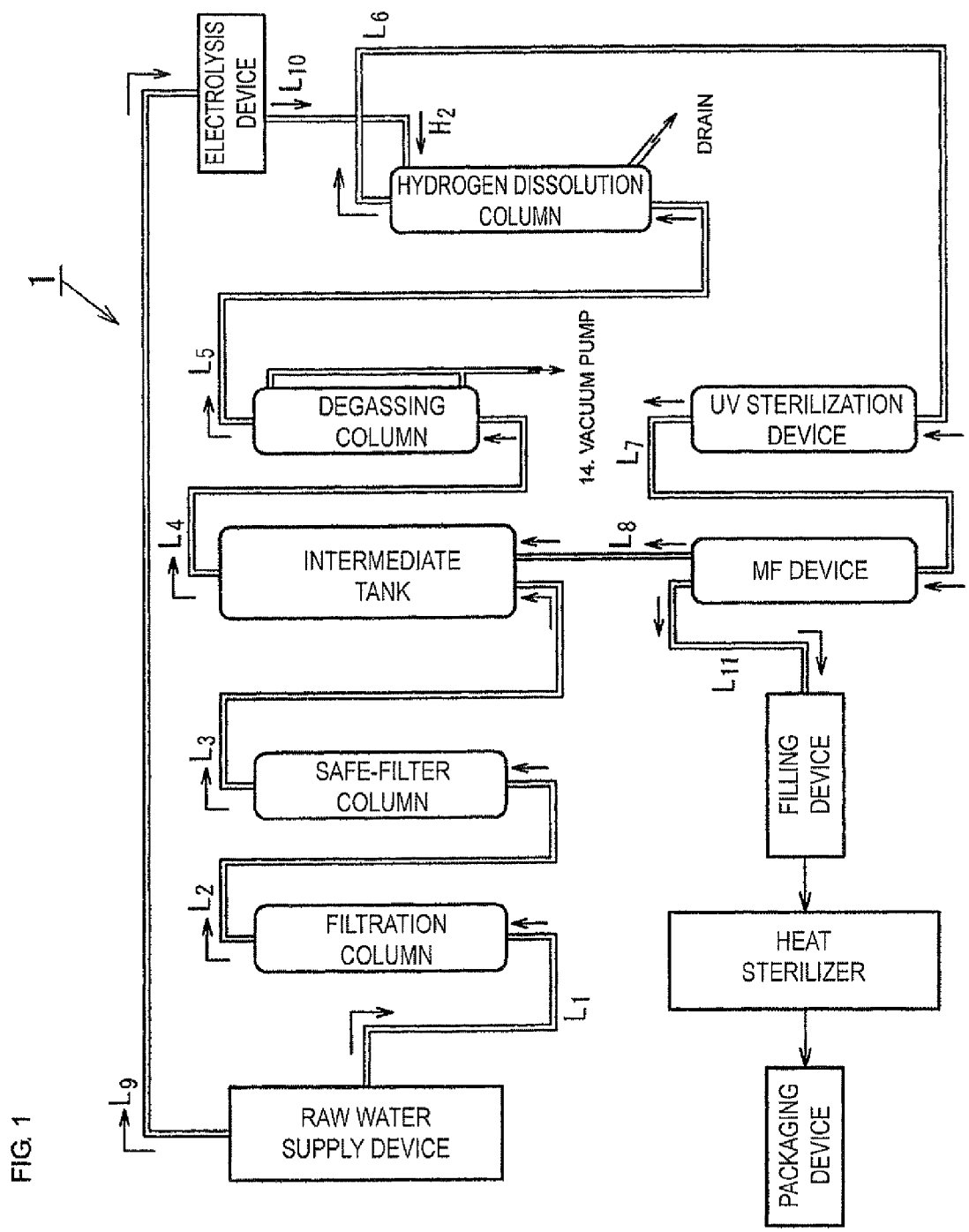
FIG. 1 is a view showing an embodiment of a production apparatus of hydrogen-containing water for thinking that is usable in a process for producing hydrogen-containing water for drinking according to the present invention.

A process for producing hydrogen-containing water for drinking according to the present invention is characterized by including (a) a purifying step, (b) a degassing step, (c) a hydrogen-dissolving step, (d) a sterilizing step, (e) a filling step, and (f) a heat-sterilizing step, and by continuously carrying out each of the steps in a closed system. In particular, the process is characterized by using a hydrogen dissolution device equipped with a gas permeable membrane module in (c) the hydrogen-dissolving step described above.

The present invention will be described below in detail.

(a) Purifying Step

This step is a step of filtering water as a raw material with a purification device and transferring the obtained purified water to a degasser.

The water as a raw material is not specifically limited as long as it is supplied from a water source suited for drinking, and examples thereof include tap water (water supplied from water service provided by water utility, private water service, or small scale private water service) and groundwater.

The purification device includes an activated carbon filtration device and a membrane filtration device.

The activated carbon filtration device removes musty smell and trihalomethanes from, and dechlorinates, water as the raw material. A safe filter filtration device removes suspended substances (including activated carbon), bacteria such as *E. coli*, pathogenic protozoa such as *Cryptosporidium*, and the like.

Examples of the membrane usable for the membrane filtration device include a microfiltration membrane (MF membrane), an ultrafiltration membrane (UF membrane), a nanofiltration membrane (NF membrane), and a reverse osmosis membrane (RO membrane). The MF membrane is desirably used considering operability and residual property of mineral components that determine the taste when used for drinking. Though the NF membrane or the RO membrane may be used for the membrane permeation treatment, the mineral components dissolved in raw water, such as sodium ions and potassium ions, are also removed by such a membrane. Hence, in order to produce water suited for drinking, the need for adjusting residual ratios of these mineral components or the need for adding such components arises, which results in complicating the operation. Thus, these membranes are not preferred.

(b) Degassing Step

This step is a step of degassing the purified water supplied to the degasser and transferring the obtained degassed water to a hydrogen dissolution device.

The degasser is not specifically limited as far as it can remove dissolved gases such as an oxygen gas, a nitrogen gas, and a carbon dioxide gas, and usable examples thereof include a vacuum degasser and a degasser equipped with a module including a gas permeable membrane (degassing membrane module). The degasser equipped with a degassing membrane module is preferred because it can efficiently remove gas dissolved in a trace amount.

The degassing membrane module is partitioned into a water room and a gas room by a degassing membrane and removes gas dissolved in the water that flows through the water room by allowing the purified water to pass through the water room and by depressurizing the gas room.

The type of the degassing membrane (hollow fiber membrane) used in the present step is not specifically limited, and examples thereof include membranes of polymer such as polypropylene, polydimethylsiloxane, a polycarbonate-polydimethylsiloxane block copolymer, a polyvinylphenol-polydimethylsiloxane-polysulfone block copolymer, poly(4-methylpentene-1-), poly(2,6-dimethylphenylene oxide), and polytetrafluoroethylene.

The present step may be carried out on heating in order to improve the degassing efficiency. For such a case, the degassed water is desirably cooled to room temperature (about 25° C.) in order to improve hydrogen-dissolving efficiency after the degassing step.

(c) Hydrogen-Dissolving Step

This step is a step of dissolving hydrogen gas in the degassed water supplied to the hydrogen dissolution device and transferring the obtained hydrogen-dissolved water to a sterilizer.

As the hydrogen dissolution device, a hydrogen dissolution device equipped with a gas permeable membrane module is used because the dissolution amounts of hydrogen gas per unit time and per unit space are large and the dissolution efficiency of hydrogen gas is readily increased.

The gas permeable membrane module is partitioned into a water room and a gas room by a gas permeable membrane and dissolves hydrogen gas in the degassed water that flows through the water room by allowing the degassed water to pass through the water room and by supplying the hydrogen gas into the gas room.

Examples of the gas permeable membrane used in the present step include polymer membranes exemplified as the degassing membrane above.

The supply method of the hydrogen gas is not specifically limited, and usable examples thereof include commercially available high purity hydrogen gas in a cylinder and hydrogen gas obtained by electrolysis of water.

For supplying the hydrogen gas into the gas room in the gas permeable membrane module, the hydrogen gas pressurized at atmospheric pressure or more, for example, at a pressure of about 1.2 atmospheres to 2.0 atmospheres may be supplied in order to increase the dissolved hydrogen concentration. However, the supply of the hydrogen gas having a pressure of more than 2.0 atmospheres needs to increase the pressure-resistance and gas tightness of various devices in the gas permeable membrane module. Thus, the production cost is increased, and such a condition is not preferable.

(d) Sterilizing Step

This step is a sterilizing step of sterilizing the hydrogen-dissolved water supplied to the sterilizer and transferring the obtained hydrogen-containing water to a filling device.

The sterilizer includes an ultraviolet irradiation device and a membrane filtration device. The ultraviolet irradiation device sterilizes the hydrogen-dissolved water and the membrane filtration device removes suspended substances, bacteria, and the like again.

Also in the present step, as with the purification device above, the MF membrane filtration device is preferably used. An MF membrane having a smaller pore size than that of the MF membrane used in the purification device described above is more desirably used because it can completely remove the suspended substances and the like.

The present invention is characterized by returning part of the hydrogen-containing water obtained in the step (d) to the degasser in the step (b) and circulating the water through the step (b) to the step (d). In particular, by temporarily stopping the supply of the purified water to the degasser during the water circulation, the hydrogen gas can be more efficiently dissolved in the degassed water to produce hydrogen-containing water having a high hydrogen gas dissolution concentration. Specifically, the dissolved hydrogen concentration that is typically about 1.6 ppm at room temperature under atmospheric pressure can be increased to about twice the concentration.

(e) Filling Step

This step is a step of filling the hydrogen-containing water supplied to the filling device into a sealed container and transferring the filled water product to a heat sterilizer.

The sealed container is not specifically limited, and examples thereof include a pouch-like container made from laminated film and the like and a metal can. A pouch-like container made from aluminum laminated film is especially preferred because it has high gas tightness to suppress hydrogen leakage. The pouch-like container may have a plastic-made spout and the like.

The hydrogen-containing water is filled in a sealed container using a filling device suited for the type of the sealed container and sealed.

(f) Heat-Sterilizing Step

This step is a step of heat-sterilizing the water product supplied to the heat sterilizer. For example, the water product is heat-sterilized using a heat steam sterilizer at 85° C. to 90° C. for 20 minutes to 1 hour.

EXAMPLES

Desirable embodiments of the present invention will be described in further detail with reference to drawings, but the present invention is not limited thereto.

FIG. 1 shows an embodiment of a production apparatus of hydrogen-containing water for drinking that is usable for the process for producing hydrogen-containing water for drinking according to the present invention.

This production apparatus 1 is broadly divided into an apparatus for producing hydrogen-containing water and an apparatus for filling the produced hydrogen-containing water.

The apparatus for producing hydrogen-containing water is basically composed of a raw water supply device 2, a filtration column 3, a safe-filter column 4, an intermediate tank 5, a degassing column 6, an electrolysis device 7, a hydrogen dissolution column 8, a UV sterilization device 9, and an MF device 10. Among them, the purification device used in the step (a) above corresponds to the filtration column 3 (activated carbon filtration device) and the safe-filter column 4 (safe filter filtration device), the degasser used in the step (b) corresponds to the degassing column 6, the hydrogen dissolution device used in the step (c) corresponds to the hydrogen dissolution column 8, and the sterilizer used in the step (d) corresponds to the UV sterilization device 9 (ultraviolet irradiation device) and the MF device 10 (MF filtration device).

The apparatus for filling the hydrogen-containing water is basically composed of a filling device 11, a heat sterilizer 12, and a packing device 13.

First, water as a raw material supplied from the raw water supply device 2 is supplied through a pipe line L1 to the filtration column 3 filled with an activated carbon layer and treated with the activated carbon to be dechlorinated.

Next, the water discharged from the filtration column 3 is transferred through a pipe line L2 to the safe-filter column 4 equipped with an MF membrane.

Then, the purified water discharged from the safe-filter column 4 is transferred through a pipe line L3 to the intermediate tank 5.

The intermediate tank 5 serves as a temporary storage of the purified water after the purifying step, and the amount of stored water is controlled to efficiently carry out the hydrogen dissolution. That is, the supply of the purified water is temporarily stopped, the water is circulated through the intermediate tank 5, the degassing column 6, the hydrogen dissolution column 8, the UV sterilization device 9, to the MF device 10 as described later, and consequently the dissolved hydrogen concentration of the hydrogen-containing water can be efficiently increased.

Subsequently, the purified water discharged from the intermediate tank 5 is transferred through a pipe line L4 to the degassing column 6.

Figure 2:
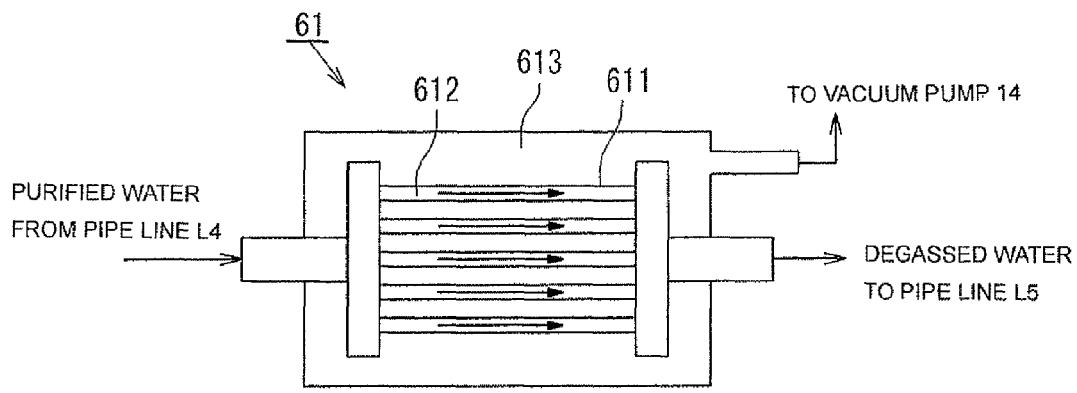
FIG. 2 is a view showing the embodiment of a degassing membrane module usable in the process for producing hydrogen-containing water for drinking according to the present invention.

The degassing column 6 is equipped with a degassing membrane module 61, and the degassing membrane module 61 is partitioned into water rooms 612 and a gas room 613 by degassing membranes 611 as shown in FIG. 2. The gas room 613 is maintained under reduced pressure using a vacuum pump 14, and then gases (such as an oxygen gas, a nitrogen gas, and a carbon dioxide gas) dissolved in the purified water flowing through the water rooms 612 permeate the degassing membranes 611 to move into the gas room 613, whereby the purified water flowing through the water rooms 612 is degassed.

The degassed water from which the dissolved gas is removed is subsequently transferred through a pipe line L5 to the hydrogen dissolution column 8 equipped with a gas permeable membrane module 81.

Figure 3:
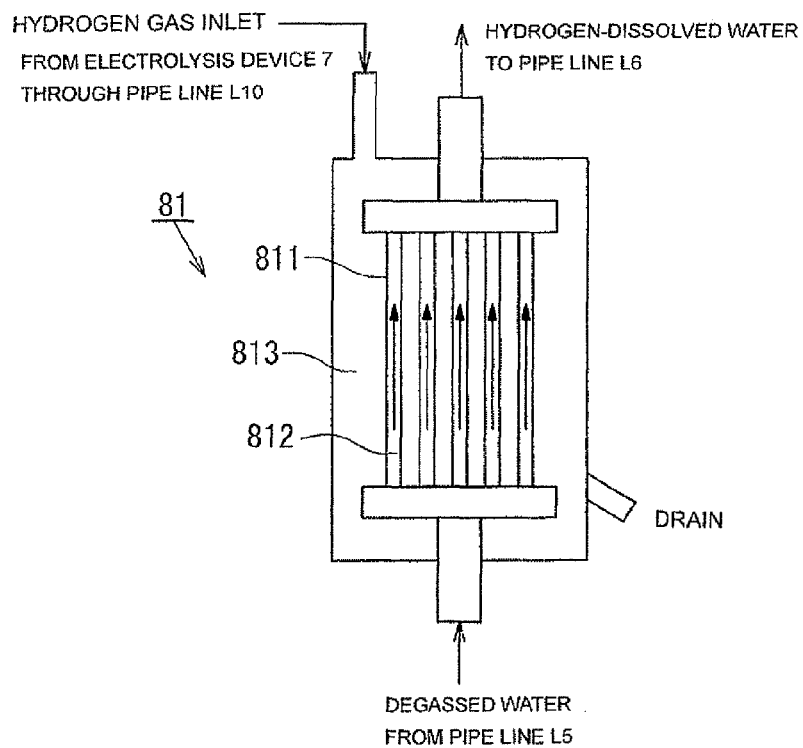
FIG. 3 is a view showing the embodiment of a gas permeable membrane module usable in the process for producing hydrogen-containing water for drinking according to the present invention.

The gas permeable membrane module 81 is partitioned into water rooms 812 and a gas room 813 by gas permeable membranes 811 as shown in FIG. 3. To the gas room 813, the hydrogen gas generated by the electrolysis device 7 is supplied through a pipe line L10. Water supplied to the electrolysis device 7 is supplied from the raw water supply device 2 through a pipe line L9.

In the gas permeable membrane module 81, the hydrogen gas supplied from the electrolysis device 7 is pressurized and transferred to the gas room 813, and then the hydrogen gas permeates the gas permeable membranes 811 due to partial pressure difference to be supplied to the degassed water flowing through the water rooms 812, whereby the hydrogen-dissolved water can be produced.

The hydrogen-dissolved water obtained in this way is supplied through a pipe line L6 to the UV sterilization device 9, and sterilized by UV irradiation. Next, the sterilized water is supplied through a pipe line L7 to the MF device 10, and subjected to membrane filtration treatment.

Part of the obtained hydrogen-containing water is returned through a pipe line L8 to the intermediate tank 5. Then, the hydrogen-containing water is circulated through the intermediate tank 5, the degassing column 6, the hydrogen dissolution column 8, the UV sterilization device 9, the MF device 10, to the intermediate tank 5, and thus the dissolved hydrogen concentration of the hydrogen-containing water is efficiently increased.

The production apparatus as shown in FIG. 1 was actually used to produce hydrogen-containing water using tap water as the raw water with the process for producing hydrogen-containing water for drinking according to the present invention. As a result, the dissolved hydrogen concentration was increased, for example, to about 2.97 ppm (2.85 to 3.09 ppm) by the water circulation as described above. In contrast, the hydrogen ion concentration remained about 2.82 ppm when water was not circulated.

The obtained hydrogen water had a pH of 6.5 to 7.3 and a mineral content (hardness) of 30 to 50 mg/L, and common bacteria and coliform organisms were not observed.

The water that is circulated through the intermediate tank 5 to the MF device 10 to increase the dissolved hydrogen concentration as described above is subsequently transferred through a pipe line L11 to the filling device 11.

The filling device 11 includes a filling tank and a filler. The hydrogen-containing water is first supplied to the filling tank, and then filled and sealed in a sealed container with the filler.

Subsequently, the water product filled and sealed in the sealed container is heat sterilized with the heat sterilizer 12, and finally packed in a box with the packing device 13.

As described above, with the process for producing hydrogen-containing water for drinking according to the present invention having the configuration described above, hydrogen gas can be efficiently dissolved at high concentration, and safe and tasty hydrogen-containing water can be produced.

DESCRIPTION OF REFERENCE NUMERALS

1 Production apparatus of hydrogen-containing water for drinking
2 Raw water supply device
3 Filtration column
4 Safe-filter column
5 Intermediate tank
6 Degassing column
   61 Degassing membrane module
   611 Degassing membrane
   612 Water room
   613 Gas room
7 Electrolysis device
8 Hydrogen dissolution column
   81 Gas permeable membrane module
   811 Gas permeable membrane
   812 Water room
   813 Gas room
9 UV sterilization device
10 MF device
11 Filling device
12 Heat sterilizer
13 Packing device
14 Vacuum pump
L1 to L11 Pipe lines

The invention claimed is:

1. A process for continuously producing sterilized hydrogen-containing water for drinking, comprising:
(a) a purifying step of filtering and purifying water as a raw material in a purification device and transferring the purified water obtained to a degasser;
(b) a degassing step of degassing the purified water supplied to the degasser and transferring the degassed water obtained to a hydrogen dissolution device;
(c) a hydrogen-dissolving step of dissolving hydrogen gas in the degassed water supplied to the hydrogen dissolution device and transferring the hydrogen-dissolved water obtained to a sterilizer;
(d) a sterilizing step of sterilizing the hydrogen-dissolved water supplied to the sterilizer with ultraviolet irradiation and transferring the sterilized water obtained to a filling device;
(e) a filling step of filling a sealable container with the sterilized water supplied to the filling device and sealing the sealable container to form a filled water product, and transferring the filled water product to a heat sterilizer; and
(f) a heat-sterilizing step of heat-sterilizing the filled water product supplied to the heat sterilizer,
wherein:
the hydrogen dissolution device is partitioned into a water room and a gas room by a gas permeable membrane and includes a gas permeable membrane module that dissolves hydrogen gas in the degassed water by allowing the degassed water to pass through the water room and by pressurizing the hydrogen gas and supplying the pressurized hydrogen gas into the gas room, and part of the hydrogen-containing water obtained in the step (d) is returned to the degasser in the step (b) and the water is circulated through the steps (b) to (d);
the purification device in the step (a) includes an activated carbon filtration device and a microfiltration membrane filtration device;
the degasser in the step (b) is partitioned into a water room and a gas room by a degassing membrane and includes a degassing membrane module that allows the purified water to pass through the water room and depressurizes the gas room,
the degassing membrane is a membrane of a polymer selected from the group consisting of polypropylene, polydimethylsiloxane, a polycarbonate-polydimethylsiloxane block copolymer, a polyvinylphenol-polydimethylsiloxane-polysulfone block copolymer, poly(4-methylpentene-1-), poly(2,6-dimethylphenylene oxide), and polytetrafluoroethylene,
the sterilizer in the step (d) includes an ultraviolet irradiation device and a microfiltration membrane filtration device, and
supply of the purified water to the degasser is temporarily stopped and the water is circulated through (b) the degassing step, (c) the hydrogen-dissolving step, to (d) the sterilizing step.

2. The process according to claim 1, wherein the hydrogen gas is supplied into the gas room in the gas permeable membrane module at a pressure of 1.2 atmospheres to 2.0 atmospheres in step (c).

* * * * *